(12) United States Patent
Zachrisson et al.

(10) Patent No.: US 11,549,551 B2
(45) Date of Patent: Jan. 10, 2023

(54) SHAFT

(71) Applicant: Volvo Truck Corporation, Gothenburg (SE)

(72) Inventors: Jan Zachrisson, Onsala (SE); Martin Sjöholm, Växjö (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/532,961

(22) Filed: Nov. 22, 2021

(65) Prior Publication Data

US 2022/0163060 A1    May 26, 2022

(30) Foreign Application Priority Data

Nov. 26, 2020 (EP) .................................. 20210000

(51) Int. Cl.
*F16C 11/04* (2006.01)
*B62D 7/16* (2006.01)
*B62D 7/18* (2006.01)

(52) U.S. Cl.
CPC .............. *F16C 11/04* (2013.01); *B62D 7/163* (2013.01); *B62D 7/18* (2013.01)

(58) Field of Classification Search
CPC . B62D 7/163; B62D 7/18; F16C 11/04; F16C 2326/20; F16C 11/0685; F16C 11/0695; F16C 11/0604; F16C 2226/12; F16C 2240/70; F16B 21/16
USPC .................................................. 280/93.512
See application file for complete search history.

(56) References Cited

U.S. PATENT DOCUMENTS

2010/0172703 A1    7/2010    Neubold

FOREIGN PATENT DOCUMENTS

| CN | 110023638 A | * | 7/2019 | .......... F16C 11/0638 |
| DE | 20315778 U1 | | 12/2003 | |
| EP | 2476853 A1 | | 7/2012 | |
| WO | WO-2008104538 A1 | * | 9/2008 | ............... B23C 5/10 |
| WO | 2014130273 A1 | | 8/2014 | |

OTHER PUBLICATIONS

Extended European Search Report for European Patent Application No. 20210000.4, dated May 21, 2021, 6 pages.

* cited by examiner

*Primary Examiner* — Paul N Dickson
*Assistant Examiner* — Caitlin Anne Miller
(74) *Attorney, Agent, or Firm* — Withrow & Terranova, PLLC

(57) ABSTRACT

The present disclosure relates to a shaft adapted to be at least partially inserted into an opening of a shaft receiver. The shaft comprises a nominal shaft portion adapted to be at least partially inserted into the opening of the shaft receiver, followed by an intermediate shaft portion that in turn is followed by a guide shaft portion terminating the shaft. The shaft comprises a cross-section with a cross-sectional contour in a plane including the central axis, the cross-sectional contour comprising a nominal shaft portion contour of the nominal shaft portion, an intermediate shaft portion contour of the intermediate shaft portion and a guide shaft portion contour of the guide shaft portion. The cross-sectional contour comprises a radial direction being perpendicular to the central axis, wherein, as seen in the radial direction, the nominal shaft portion contour is located at a nominal radial distance from the central axis.

15 Claims, 4 Drawing Sheets

SHAFT

RELATED APPLICATIONS

The present application claims priority to European Patent Application no. 20210000.4, filed on Nov. 26, 2020, and entitled "SHAFT," which is incorporated herein by reference in its entirety.

TECHNICAL FIELD

The present invention relates to a shaft adapted to be at least partially inserted into an opening of a shaft receiver. Moreover, the present invention relates to a kit comprising a shaft and a shaft receiver. Moreover, the present invention relates to a vehicle.

BACKGROUND OF THE INVENTION

In many applications, it is desired to at least partially insert a shaft into an opening of a shaft receiver. In order to obtain a tight fit between the shaft and the shaft receiver, the cross-sectional area of the shaft is often similar to the cross-sectional area of the opening of the shaft receiver. However, the similarity in cross-sectional areas may be associated with challenges when assembling the shaft and the shaft receiver, i.e. when at least partially inserting the shaft into the shaft opening. An example of such a challenge may be a so called "sticky drawer effect" in which the shaft is stuck in the opening before a proper and final position of the shaft relative to the shaft receiver is reached. This in turn implies a prolonged assembly time which may potentially slow down the production rate of a production line for instance.

In order to mitigate the above potential problem, it is known to cool the shaft and/or heat the shaft receiver in order to temporarily obtain an increased difference in cross sectional areas of the shaft and shaft receiver, respectively, in order to ensure a smooth insertion of the shaft into the shaft receiver. However, the above procedure may be cumbersome since the cooling and/or heating requires additional equipment and may also result in permanent and/or undesired deformations or changes in material properties of any one of the shaft and the shaft receiver.

As such, it would be desired to have a shaft that can be inserted into a shaft receiver in a time efficient manner without the need for cooling and/or heating.

SUMMARY OF THE INVENTION

In view of the above, an object of the present invention is to obtain a shaft, at least a portion of which can be inserted into an opening of a shaft receiver in a time efficient manner.

The above object is achieved by a shaft.

As such, the present invention relates to a shaft adapted to be at least partially inserted into an opening of a shaft receiver. The shaft has an axial extension along an axial direction and, as seen in a direction along the axial direction towards an end of the shaft, the shaft comprises:

a nominal shaft portion adapted to be at least partially inserted into the opening of the shaft receiver, followed by an intermediate shaft portion that in turn is followed by a guide shaft portion terminating the shaft.

The shaft has a central axis extending in the axial direction and being located in the center of a cross-section perpendicular to the axial direction of the nominal shaft portion. The central axis extends in a direction from the nominal shaft portion towards the guide shaft portion.

The shaft comprises a cross-section with a cross-sectional contour in a plane including the central axis, the cross-sectional contour comprising a nominal shaft portion contour of the nominal shaft portion, an intermediate shaft portion contour of the intermediate shaft portion and a guide shaft portion contour of the guide shaft portion. The cross-sectional contour comprises a radial direction being perpendicular to the central axis, wherein, as seen in the radial direction, the nominal shaft portion contour is located at a nominal radial distance from the central axis.

According to the present invention, a smallest distance, as seen in the radial direction, from the central axis to the intermediate shaft portion contour, occurs at an intermediate shaft portion contour trough and is less than 99%, preferably less than 95%, more preferred less than 90%, of the nominal radial distance. Moreover, a largest distance, as seen in the radial direction, from the central axis to the guide shaft portion contour, occurs at a guide shaft portion contour crest, is greater than the smallest distance, and is within the range of 95% to 100%, preferably within the range of 98% to 100%, of the nominal radial distance.

Furthermore, the guide shaft portion contour comprises a guide shaft portion contour insert portion being located at a distance of at least 1% of the nominal radial distance in front of the guide shaft portion contour crest, as seen in a direction of the central axis, wherein the distance, as seen in the radial direction, from the guide shaft portion contour crest to the guide shaft portion contour insert portion is at least 1% of the nominal radial distance.

By virtue of the shaft according to the present invention, the guide shaft portion, or at least a portion thereof, may be allowed to be inserted into the opening of the shaft receiver. Once the guide shaft portion is at least partially inserted in the opening of the shaft receiver, the shaft may be allowed to be pivoted relative to the shaft receiver because of the relative dimensions of at least the intermediate shaft portion and the guide shaft portion. This in turn implies that the shaft may be appropriately aligned with the opening of the shaft receiver before and/or as the shaft is moved further into the opening. As such, the shaft according to the present invention is less prone, as compared to e.g. a cylindrical shaft, to jam as the shaft is moved to its intended final position relative to the shaft receiver.

Optionally, the distance, as seen in the radial direction, from the guide shaft portion contour crest to the guide shaft portion contour insert portion is smaller than 3% of the nominal radial distance. Such a distance implies that the guide shaft portion may be appropriately inserted into the opening.

Optionally, a distance, as seen in a direction of the central axis, between the intermediate shaft portion contour trough and the guide shaft portion contour crest, is within the range of at least 1-5%, preferably within the range of 2-4% of the nominal radial distance. A distance within any one of the above ranges implies that the shaft may be appropriately pivoted relative to the shaft receiver when the shaft is inserted into the opening.

Optionally, the guide shaft portion contour follows an arc of a sector of a circle from the guide shaft portion contour crest to the guide shaft portion contour insert portion, as seen in the cross-section. The sector of a circle has a radius being within the range of 95% to 100%, preferably within the range of 98% to 100%, of the nominal radial distance. The fact that the guide shaft portion contour follows an arc of a sector of a circle also implies that the shaft may be appropriately pivoted relative to the shaft receiver when the shaft is inserted into the opening.

Optionally, the sector of a circle comprises, in addition to the arc, a first leg and a second leg, each one of which having a length corresponding to the radius the sector of a circle, the first and second legs intersecting at a sector center point, preferably the sector center point is located on the central axis.

Optionally, the sector of a circle has a central angle between the first and second legs, the central angle being within the range of 2-12°, preferably within the range of 4-8°. A central angle within any one of the above ranges implies a smooth insertion of the guide shaft portion into the opening as well as implies an appropriate pivoting of the shaft relative to the shaft receiver when the shaft is inserted into the opening.

Optionally, seen along the arc, the guide shaft portion contour has a first arc length from the guide shaft portion contour crest to the first leg and a second arc length from the guide shaft portion contour crest to the second leg. A ratio between the first arc length and the second arc length is within the range of 0.9-1.1, preferably within the range of 0.95-1.05. As such, the arc may be substantially symmetrically arranged around the guide shaft portion contour crest which implies appropriate pivoting capabilities.

Optionally, at least each one the nominal shaft portion, the intermediate shaft portion and the guide shaft portion is rotationally symmetric around the central axis.

Optionally, the shaft is a unitary component.

Optionally, the shaft is a vehicle knuckle spindle.

A second aspect of the present invention relates to a kit comprising a shaft according to the first aspect of the present invention and a shaft receiver. The shaft receiver comprises an opening adapted to receive at least a portion of the shaft by a movement of the shaft relative to the opening in the axial direction.

Optionally, the opening of the shaft receiver has an opening cross-sectional area and the nominal shaft portion has a nominal shaft portion cross-sectional area, both in a plane perpendicular to the axial direction. Moreover, a ratio between the opening cross-sectional area and the nominal shaft portion cross-sectional area is within the range of 1-1.05, preferably in the range of 1-1.01.

Optionally, the shaft receiver comprises an opening entrance portion having an opening entrance portion cross-sectional area in a plane perpendicular to the axial direction. A ratio between the opening entrance portion cross-sectional area and the opening cross-sectional area is at least 1.1, preferably at least 1.2.

Optionally, a transition from the opening entrance portion to the opening occurs at a transition portion having a tapered shape as seen in the axial direction.

Optionally, the shaft receiver is a vehicle knuckle, preferably a vehicle steering knuckle.

A third aspect of the present invention relates to a vehicle comprising a shaft according to the first aspect of the present invention and/or a kit according to the second aspect of the present invention.

BRIEF DESCRIPTION OF THE DRAWINGS

With reference to the appended drawings, below follows a more detailed description of embodiments of the invention cited as examples.

In the drawings.

DETAILED DESCRIPTION OF PREFERRED EMBODIMENTS

The invention will be described below for a vehicle in the form of a truck 10 such as the truck illustrated in FIG. 1. The truck 10 should be seen as an example of a vehicle which could comprise a shaft and/or a kit according to the present invention.

However, the present invention may be implemented in a plurality of different types of assemblies. Purely by way of example, the present invention could be implemented in a vehicle such as a truck, a tractor, a car, a bus, a work machine such as a wheel loader or any other type of construction equipment. However, the present invention may also be used for assemblies not related to vehicles.

Figure 1:
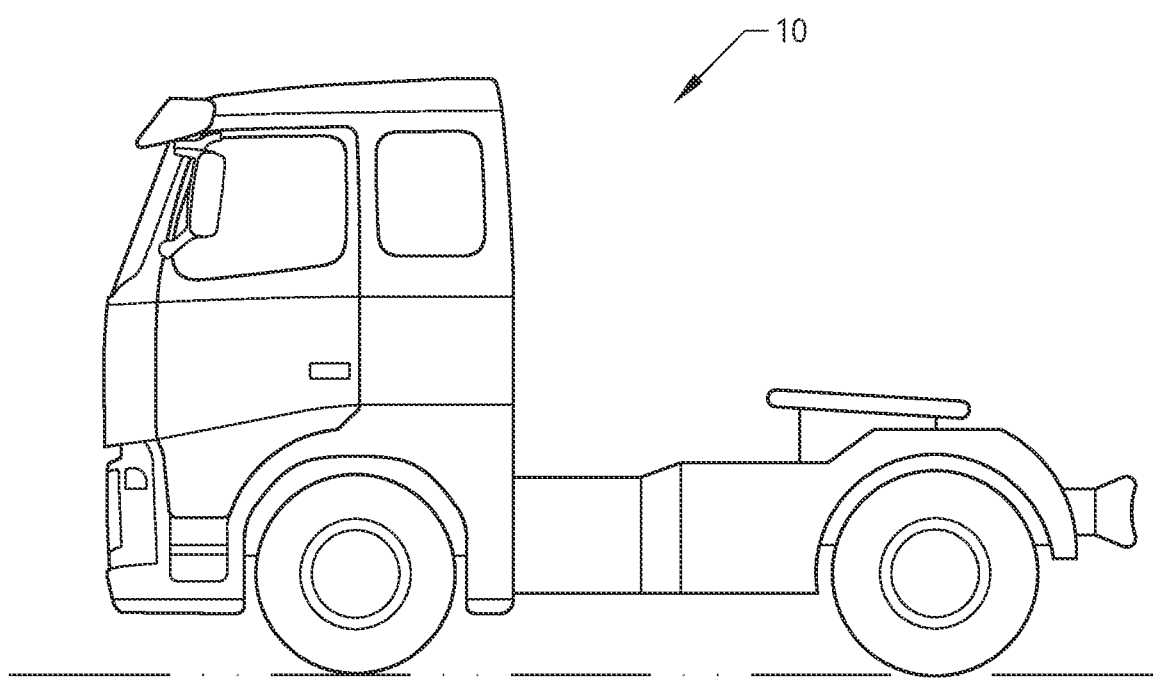
FIG. 1 is a schematic view of a vehicle.
Figure 2:
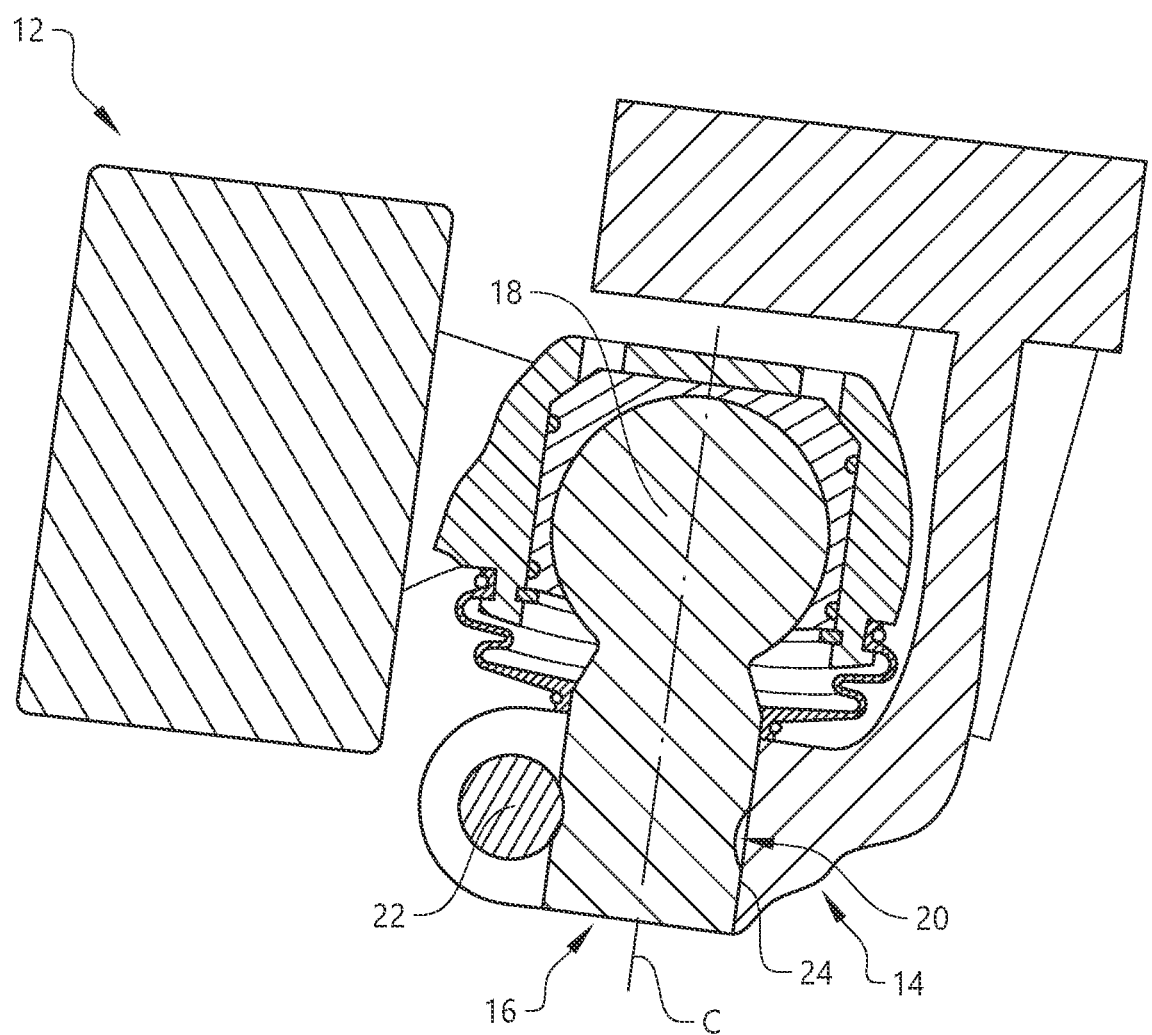
FIG. 2 is a schematic view of a knuckle assembly according to an embodiment of the present invention.

The FIG. 1 vehicle 10 comprises a plurality of assemblies in which a shaft is fitted to a shaft receiver. To this end, FIG. 2 illustrates, in a schematic manner, an implementation in which a lower control arm 12 is connected to a knuckle 14 via a shaft 16. In the implementation illustrated in FIG. 2, the shaft 16 comprises a pivot portion 18 being such that said knuckle 14 can pivot relative to the lower control arm 12. Purely by way of example, and as illustrated in FIG. 2, the pivot portion 18 may have the shape of at least a portion of a sphere in order to allow the above-mentioned relative pivoting. Moreover, in the FIG. 2 embodiment, the shaft 16 comprises a groove 20 extending circumferentially around a central axis C of the shaft 16. The groove 20 is adapted to receive a clamping screw 22 that secures the shaft 16 to the knuckle 14 once the shaft 16 has been appropriately inserted into an opening 24 of the knuckle 14.

As may be realized from FIG. 2, an operation of inserting the shaft 16 into the opening 24 of the knuckle 14 may be a time consuming operation since the shaft 16 may jam in the opening 24 before a proper and final position of the shaft 16 relative to the knuckle 14 is reached.

Figure 3:
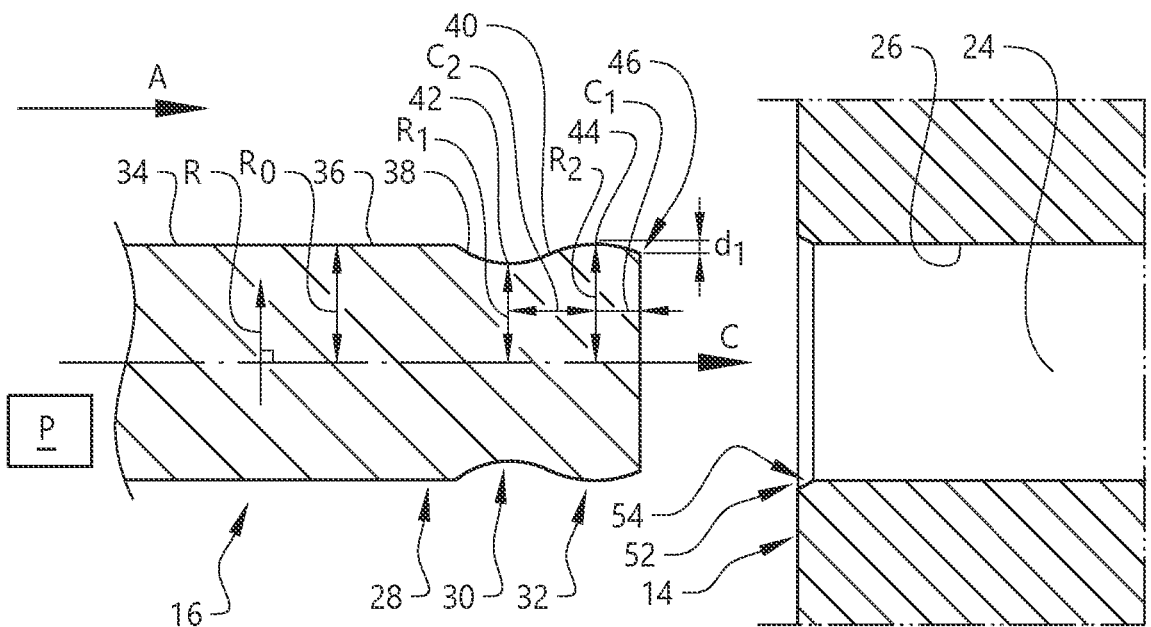
FIG. 3 is a schematic view of a shaft and a shaft receiver according to an embodiment of the present invention.

In order to mitigate the risk of having the shaft 16 jam during insertion into the opening 24, the present invention proposes a shaft as presented hereinbelow with reference to FIG. 3. FIG. 3 illustrates a cross-section of a shaft 16 and a cross-section of a shaft receiver 14. Purely by way of example, the shaft receiver 14 and the shaft 16 may be the knuckle 14 and shaft 16 discussed hereinabove with reference to FIG. 2.

As such, FIG. 3 illustrates a shaft 16 adapted to be at least partially inserted into an opening 24 of a shaft receiver 14. To this end, the shaft receiver 14 comprises a side wall assembly 26 comprising one or more walls delimiting the opening 24.

Purely by way of example, the shaft 16 may be a unitary component.

The shaft 16 has an axial extension along an axial direction A and, as seen in a direction along the axial direction towards an end of the shaft 16, the shaft 16 comprises:

a nominal shaft portion 28 adapted to be at least partially inserted into the opening 24 of the shaft receiver 14, followed by an intermediate shaft portion 30 that in turn is followed by a guide shaft portion 32 terminating the shaft 16.

Moreover, as indicated in FIG. 3, the shaft 16 has a central axis C extending in the axial direction A and located in the centre of a cross-section perpendicular to the axial direction A of the nominal shaft portion 28. The central axis C extends in a direction from the nominal shaft portion 28 towards the guide shaft portion 32.

The shaft 16 comprises a cross-section with a cross-sectional contour 34 in a plane P including the central axis C. The cross-sectional contour 34 comprises a nominal shaft portion contour 36 of the nominal shaft portion 28, an intermediate shaft portion contour 38 of the intermediate shaft portion 30 and a guide shaft portion contour 40 of the guide shaft portion 32. The cross-sectional contour comprises a radial direction R being perpendicular to the central axis C. Furthermore, as seen in the radial direction R, the nominal shaft portion contour 36 is located at a nominal radial distance $R_0$ from the central axis C. Purely by way of example, the nominal shaft portion contour 36 may comprise a straight line such that the distance, in the radial direction R, from each point of the line to the central axis C equals the nominal radial distance $R_0$. As a non-limiting example, the length of such a straight line, forming part of the nominal shaft portion contour 36, may be equal to or greater than the nominal radial distance $R_0$.

In the embodiment illustrated in FIG. 3, the cross-sectional contour 34 is symmetrical around the central axis C and any embodiment of the shaft 16 may have a cross-sectional contour 34 being symmetrical around the central axis C. However, it is also envisaged that embodiments of the shaft 16 have a cross-sectional contour 34 that is not symmetrical around the central axis C.

As a non-limiting example, at least each one the nominal shaft portion 28, the intermediate shaft portion 30 and the guide shaft portion 32 may be rotationally symmetric around the central axis C. As such, the cross-sectional contour 34 may be the same, irrespective of in which plane P the cross-section is taken, assuming that the plane includes the central axis C. In such embodiments, when the guide shaft portion contour 40 follows the arc of a sector of a circle, as will be discussed hereinbelow with reference to FIG. 4, the guide shaft portion 32 may be regarded as having a frusto-spherical shape, i.e. having a shape corresponding to a portion of a sphere.

However, it is also envisaged that embodiments of the shaft 16 may not be rotationally symmetric around the central axis C. For instance, embodiments of the shaft 16 are envisaged having e.g. a square or rectangular cross section (not shown) as seen in a second plane comprising two different axes, each one of which being perpendicular to the central axis C.

Irrespective of whether the cross-sectional contour 34 is symmetrical or non-symmetrical around the central axis C, according to the present invention, a smallest distance $R_1$, as seen in the radial direction R, from the central axis C to the intermediate shaft portion contour 38, occurs at an intermediate shaft portion contour trough 42 and is less than 99%, preferably less than 95%, more preferred less than 90%, of the nominal radial distance $R_0$. As a non-limiting example, the smallest distance $R_1$ from the central axis C to the intermediate shaft portion contour 38 may be within the range of 90-95% in order to ensure the desired pivoting of the shaft 16 whilst nevertheless not significantly reducing the strength of the shaft 16.

Moreover, a largest distance $R_2$, as seen in the radial direction R, from the central axis C to the guide shaft portion contour 40, occurs at a guide shaft portion contour crest 44, is greater than the smallest distance $R_1$, and is within the range of 95% to 100%, preferably within the range of 98% to 100%, of the nominal radial distance $R_0$.

Furthermore, the guide shaft portion contour 40 comprises a guide shaft portion contour insert portion 46 being located at a distance $C_1$ of at least 1%, preferably in the range of 1-5%, of the nominal radial distance $R_0$ in front of the guide shaft portion contour crest 44, as seen in a direction of the central axis C, wherein the distance $d_1$, as seen in the radial direction R, from the guide shaft portion contour crest 44 to the guide shaft portion contour insert portion 46 is at least 1% of the nominal radial distance $R_0$. In embodiments of the shaft wherein the guide shaft portion contour insert portion 46 comprises a line extending in the radial direction R, the distance $d_1$ from the guide shaft portion contour crest 44 to the guide shaft portion contour insert portion 46 is defined as the smallest distance between the point on the radially extending line and the guide shaft portion contour crest 44.

Purely by way of example, and as illustrated in FIG. 3, the distance $d_1$, as seen in the radial direction R, from the guide shaft portion contour crest 44 to the guide shaft portion contour insert portion 46 is smaller than 3% of the nominal radial distance $R_0$. Such a distance implies that the guide shaft portion may be appropriately inserted into the opening.

Furthermore, again with reference to FIG. 3, a distance $C_2$, as seen in a direction of the central axis C, between the intermediate shaft portion contour trough 42 and the guide shaft portion contour crest 44, may be within the range of at least 1-5%, preferably within the range of 2-4% of the nominal radial distance $R_0$.

Figure 4:
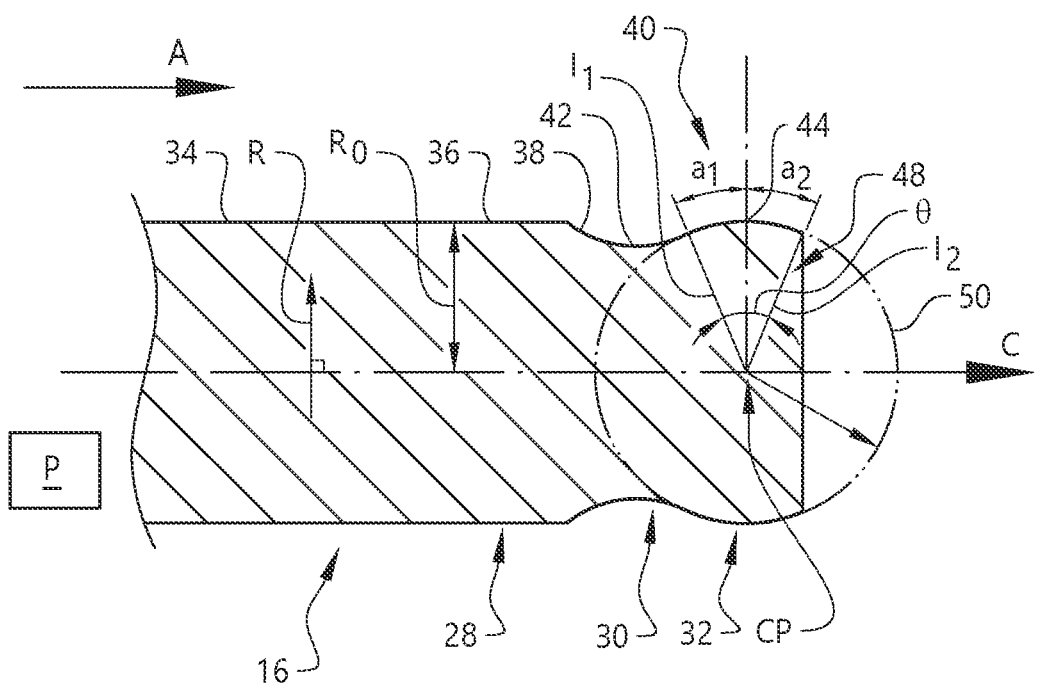
FIG. 4 illustrates the FIG. 3 shaft with additional references.

It should be noted that in FIG. 3 and FIG. 4, the differences between the contours for instance have been exaggerated in order to place emphasis on various features of the present invention.

FIG. 4 illustrates a portion of the cross-sectional contour 34 in which the guide shaft portion contour 44 follows an arc of a sector 48 of a circle 50 from the guide shaft portion contour crest 44 to the guide shaft portion contour insert portion 46, as seen in the cross-section. The sector of a circle has a radius $R_C$ being within the range of 95% to 100%, preferably within the range of 98% to 100%, of the nominal radial distance $R_0$.

Purely by way of example, and as indicated in FIG. 4, the sector 48 of a circle 50 comprises, in addition to the arc, a first leg $l_1$ and a second leg $l_2$, each one of which having a length corresponding to the radius $R_C$ of the sector 48 of a circle 50. The first and second legs $l_1$, $l_2$ may intersect at a sector centre point CP. Purely by way of example, and as indicated in FIG. 4, the sector centre point CP may be located on the central axis C.

Furthermore, and as also indicate in FIG. 4, the sector 48 of a circle 50 may have a central angle θ between the first and second legs. As a non-limiting example, the central angle θ may be within the range of 2-12°, preferably within the range of 4-8°. Furthermore, again with reference to FIG. 4, as seen along the arc, the guide shaft portion contour has a first arc length $a_1$ from the guide shaft portion contour crest 44 to the first leg $l_1$ and a second arc length $a_2$ from the guide shaft portion contour crest 44 to the second leg $l_2$. A ratio between the first arc length and the second arc length may within the range of 0.9-1.1, preferably within the range of 0.95-1.05. As such, the arc may be substantially symmetrically arranged around the guide shaft portion contour crest 44, as indicated in FIG. 4.

Reverting to FIG. 3, a second aspect of the present invention relates to a kit comprising a shaft 16 according to the first aspect of the present invention and a shaft receiver 14. As has been presented hereinabove, the shaft receiver 14 comprises an opening 24 adapted to receive at least a portion of the shaft 16 by a movement of the shaft 16 relative to the opening 24 in the axial direction A.

Purely by way of example, the opening 24 of the shaft receiver 14 has an opening cross-sectional area and the nominal shaft portion has a nominal shaft portion cross-sectional area, both in a plane perpendicular to the axial direction. As a non-limiting example, a ratio between the opening cross-sectional area and the nominal shaft portion cross-sectional area is within the range of 1-1.05, preferably in the range of 1-1.01.

Furthermore, FIG. 3 illustrates a non-limiting example in which the shaft receiver 14 comprises an opening entrance portion 52 having an opening entrance portion cross-sectional area in a plane perpendicular to the axial direction A. A ratio between the opening entrance portion cross-sectional area and the opening cross-sectional area may be at least 1.1, preferably at least 1.2. Furthermore, as indicated in FIG. 3, a transition from the opening entrance portion 52 to the opening 24 may occur at a transition portion 54 having a tapered shape as seen in the axial direction A.

Figure 5:
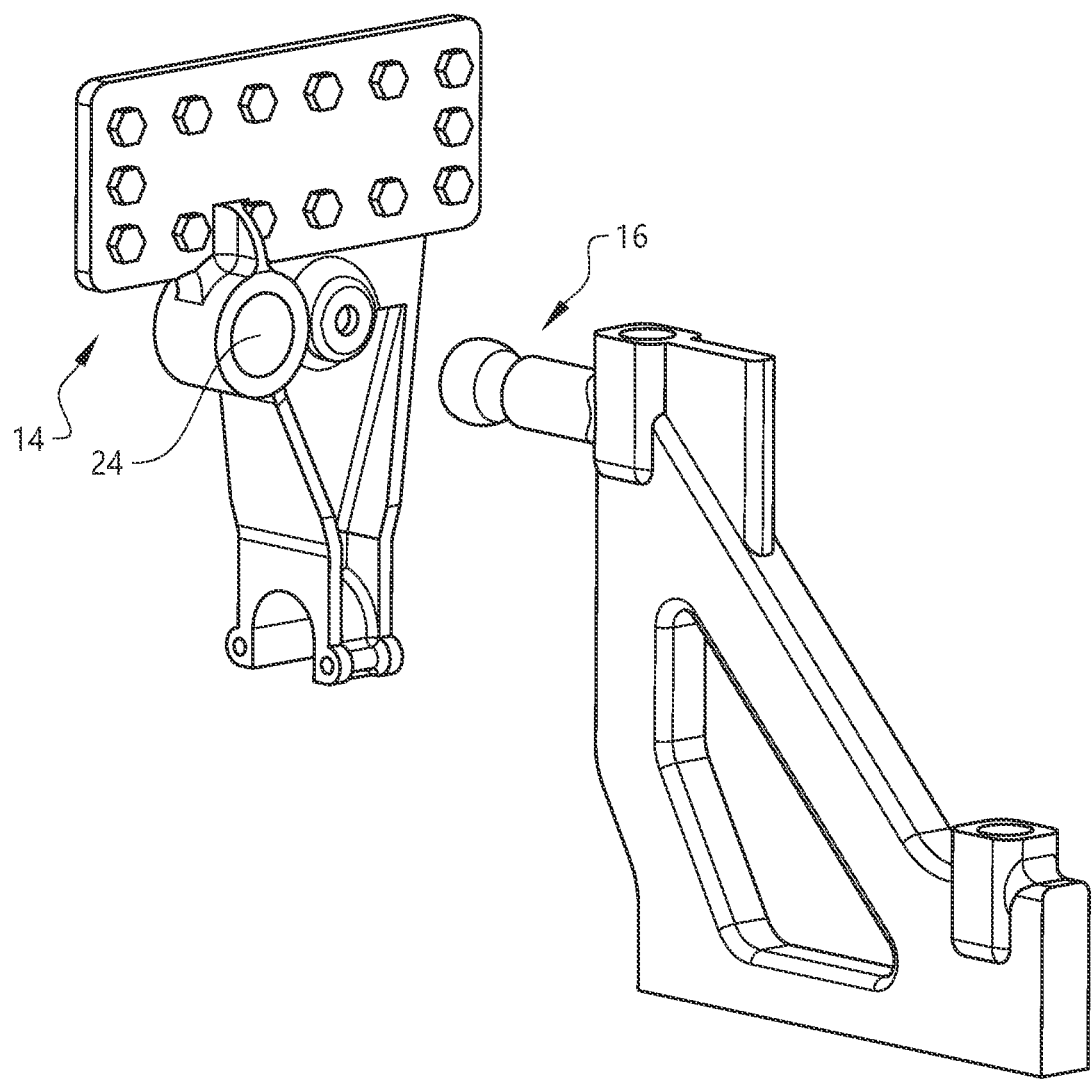
FIG. 5 is a schematic perspective view of another embodiment of the present invention.

While FIG. 2 illustrates a preferred embodiment of the present invention, the shaft 16 that has been presented hereinabove may be used in a plurality of different applications, e.g. vehicle applications. To this end, FIG. 5 illustrates an embodiment in which the shaft receiver 14 is constituted by a battery bracket and the shaft 16 forms part of a reaction rod bracket. By virtue of the features of the shaft 16 according to the present invention, the shaft 16 may be inserted in the opening 24 of the battery bracket in a time efficient manner even though each one of the battery bracket and the reaction rod bracket may be relatively large components.

It is to be understood that the present invention is not limited to the embodiments described above and illustrated in the drawings; rather, the skilled person will recognize that many changes and modifications may be made within the scope of the appended claims.

The invention claimed is:

1. A shaft adapted to be at least partially inserted into an opening of a shaft receiver, the shaft having an axial extension along an axial direction and comprising:
   a nominal shaft portion adapted to be at least partially inserted into the opening of the shaft receiver,
   an intermediate shaft portion,
   a guide shaft portion terminating the shaft,
   a central axis extending in the axial direction in the center of a cross-section perpendicular to the axial direction of the nominal shaft portion, the central axis extending in a direction from the nominal shaft portion towards the guide shaft portion,
   a cross-section with a cross-sectional contour in a plane including the central axis, the cross-sectional contour comprising a nominal shaft portion contour of the nominal shaft portion, an intermediate shaft portion contour of the intermediate shaft portion, and a guide shaft portion contour of the guide shaft portion, the cross-sectional contour comprising a radial direction being perpendicular to the central axis, wherein the nominal shaft portion contour is located at a nominal radial distance from the central axis,
   wherein a smallest distance from the central axis to the intermediate shaft portion contour occurs at an intermediate shaft portion contour trough and is less than 99% of the nominal radial distance,
   wherein a largest distance from the central axis to the guide shaft portion contour occurs at a guide shaft portion contour crest, is greater than the smallest distance, and is within a range of 95% to 100% of the nominal radial distance, and
   wherein the guide shaft portion contour comprises a guide shaft portion contour insert portion being located at a distance of at least 1% of the nominal radial distance in front of the guide shaft portion contour crest, wherein the distance from the guide shaft portion contour crest to the guide shaft portion contour insert portion is at least 1% of the nominal radial distance.

2. The shaft of claim 1, wherein a distance from the guide shaft portion contour crest to the guide shaft portion contour insert portion is smaller than 3% of the nominal radial distance.

3. The shaft of claim 1, wherein a distance between the intermediate shaft portion contour trough and the guide shaft portion contour crest is within a range of at least 1-5% of the nominal radial distance.

4. The shaft of claim 1, wherein the guide shaft portion contour follows an arc of a sector of a circle from the guide shaft portion contour crest to the guide shaft portion contour insert portion, the sector of the circle having a radius within a range of 95% to 100% of the nominal radial distance.

5. The shaft of claim 4, wherein the sector of the circle comprises a first leg and a second leg, each having a length corresponding to the radius of the sector of the circle, the first and second legs intersecting at a sector center point.

6. The shaft of claim 5, wherein the sector of the circle has a central angle between the first and second legs within a range of 2-12°.

7. The shaft of claim 5, wherein as seen along the arc, the guide shaft portion contour has a first arc length from the guide shaft portion contour crest to the first leg and a second arc length from the guide shaft portion contour crest to the second leg, a ratio between the first arc length and the second arc length being within a range of 0.9-1.1.

8. The shaft of claim 1, wherein at least each of the nominal shaft portion, the intermediate shaft portion, and the guide shaft portion is rotationally symmetric around the central axis.

9. The shaft of claim 1, wherein the shaft is a unitary component.

10. The shaft of claim 1, wherein the shaft is a vehicle knuckle spindle.

11. A kit comprising:
    a shaft adapted to be at least partially inserted into an opening of a shaft receiver, the shaft having an axial extension along an axial direction and comprising:
    a nominal shaft portion adapted to be at least partially inserted into the opening of the shaft receiver,
    an intermediate shaft portion,
    a guide shaft portion terminating the shaft,
    a central axis extending in the axial direction in the center of a cross-section perpendicular to the axial direction of the nominal shaft portion, the central axis extending in a direction from the nominal shaft portion towards the guide shaft portion,
    a cross-section with a cross-sectional contour in a plane including the central axis, the cross-sectional contour comprising a nominal shaft portion contour of the nominal shaft portion, an intermediate shaft portion contour of the intermediate shaft portion, and a guide shaft portion contour of the guide shaft portion, the cross-sectional contour comprising a radial direction being perpendicular to the central axis, wherein the nominal shaft portion contour is located at a nominal radial distance from the central axis, wherein a smallest distance from the central axis to the intermediate shaft portion contour occurs at an intermediate shaft portion contour trough and is less than 99% of the nominal radial distance, wherein a largest distance from the central axis to the guide shaft portion contour occurs at a guide shaft portion contour crest, is greater than the smallest distance, and is within a range of 95% to 100% of the nominal radial distance, and wherein the guide shaft portion contour comprises a guide shaft portion contour insert portion being located at a distance of at least 1% of the nominal radial distance in front of the guide shaft portion contour crest, wherein the distance from the guide shaft portion contour crest to the guide shaft portion contour insert portion is at least 1% of the nominal radial distance, and a shaft receiver, the shaft receiver comprising an opening adapted to receive at least a portion of the shaft by a movement of the shaft relative to the opening in the axial direction.

12. The kit of claim 11, wherein the opening of the shaft receiver has an opening cross-sectional area and the nominal shaft portion has a nominal shaft portion cross-sectional area, both in a plane perpendicular to the axial direction, a ratio between the opening cross-sectional area and the nominal shaft portion cross-sectional area being in a range of 1-1.05.

13. The kit of claim 12, wherein the shaft receiver comprises an opening entrance portion having an opening entrance portion cross-sectional area in a plane perpendicular to the axial direction, a ratio between the opening entrance portion cross-sectional area and the opening cross-sectional area being at least 1.1.

14. The kit of claim 11, wherein the shaft receiver is a vehicle knuckle, preferably a vehicle steering knuckle.

15. A vehicle comprising:
a shaft adapted to be at least partially inserted into an opening of a shaft receiver, the shaft having an axial extension along an axial direction and comprising:
  a nominal shaft portion adapted to be at least partially inserted into the opening of the shaft receiver,
  an intermediate shaft portion,
  a guide shaft portion terminating the shaft,
  a central axis extending in the axial direction in the center of a cross-section perpendicular to the axial direction of the nominal shaft portion, the central axis extending in a direction from the nominal shaft portion towards the guide shaft portion,
  a cross-section with a cross-sectional contour in a plane including the central axis, the cross-sectional contour comprising a nominal shaft portion contour of the nominal shaft portion, an intermediate shaft portion contour of the intermediate shaft portion, and a guide shaft portion contour of the guide shaft portion, the cross-sectional contour comprising a radial direction being perpendicular to the central axis, wherein the nominal shaft portion contour is located at a nominal radial distance from the central axis, wherein a smallest distance from the central axis to the intermediate shaft portion contour occurs at an intermediate shaft portion contour trough and is less than 99% of the nominal radial distance, wherein a largest distance from the central axis to the guide shaft portion contour occurs at a guide shaft portion contour crest, is greater than the smallest distance, and is within a range of 95% to 100% of the nominal radial distance, and wherein the guide shaft portion contour comprises a guide shaft portion contour insert portion being located at a distance of at least 1% of the nominal radial distance in front of the guide shaft portion contour crest, wherein the distance from the guide shaft portion contour crest to the guide shaft portion contour insert portion is at least 1% of the nominal radial distance.

* * * * *